United States Patent [19]

Saito et al.

[11] Patent Number: 5,072,144

[45] Date of Patent: Dec. 10, 1991

[54] MOVING-COIL LINEAR MOTOR

[75] Inventors: Jun Saito; Yoshikazu Matsumoto; Yasuo Suzuki; Yukihiko Okamura; Hironobu Hori; Norito Shiraiwa, all of Kadoma, Japan

[73] Assignee: Matsushita Electric Works, Ltd., Osaka, Japan

[21] Appl. No.: 544,936

[22] Filed: Jun. 28, 1990

[30] Foreign Application Priority Data

Jul. 15, 1989 [JP] Japan ................................ 1-182813

[51] Int. Cl.[5] ........................................ H02K 41/00

[52] U.S. Cl. ........................................ 310/12; 318/135

[58] Field of Search .......................... 310/12, 13, 14; 318/135

[56] References Cited

U.S. PATENT DOCUMENTS

| | | | |
|---|---|---|---|
| 4,151,447 | 4/1979 | von der Heide et al. | 318/135 |
| 4,439,698 | 3/1984 | Chen | 310/12 |
| 4,633,108 | 12/1986 | von der Heide | 310/12 |
| 4,641,065 | 2/1987 | Shibuki et al. | 318/135 |
| 4,839,543 | 6/1989 | Beakley et al. | 310/12 |

FOREIGN PATENT DOCUMENTS

| | | | |
|---|---|---|---|
| 0171156 | 7/1988 | Japan | 310/12 |
| 1-103385 | 7/1989 | Japan . | |
| 0278253 | 11/1989 | Japan | 310/12 |
| 0308160 | 12/1989 | Japan | 310/12 |

*Primary Examiner*—Steven L. Stephan
*Assistant Examiner*—Judson H. Jones
*Attorney, Agent, or Firm*—Burns, Doane, Swecker & Mathis

[57] ABSTRACT

A moving-coil linear motor is formed with a stator means forming a guide and having a permanent magnet array having opposite poles alternately at constant intervals in longitudinal direction of the stator means, and a mover means mounted on the stator means for being movable through an electromagnetic force along the stator means, the mover means having three-phase moving coils wound in bipolar system on cores U-shaped in section. Positive and negative voltages are alternately applied through brushes to the moving coils of the mover means, while its U-shaped cores are opposed to the permanent magnet array, disposing the array between both leg portions of the U-shaped cores, with the magnetic efficiency of the motor thereby remarkably improved while sufficiently effectively minimizing the size.

7 Claims, 8 Drawing Sheets

10 12 21 21b 24a 13c 15 11 17 16 14 13a 13 21a 23 22 24 22a 23a 22b 23b 13b 10
12
13b
23b
22b
23a
22a
24
22
23
21a
21
21b
24a
13
13a
14
16
17
13c
15
11

Fig.17
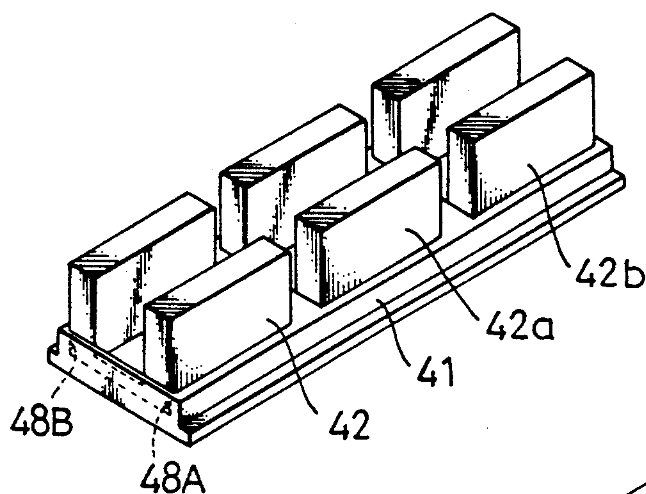
Fig.18
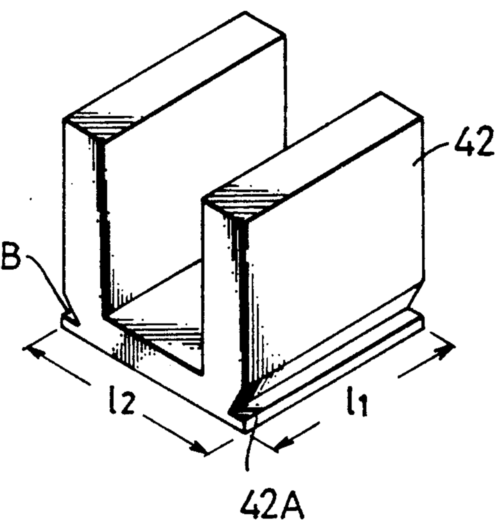
Fig.19
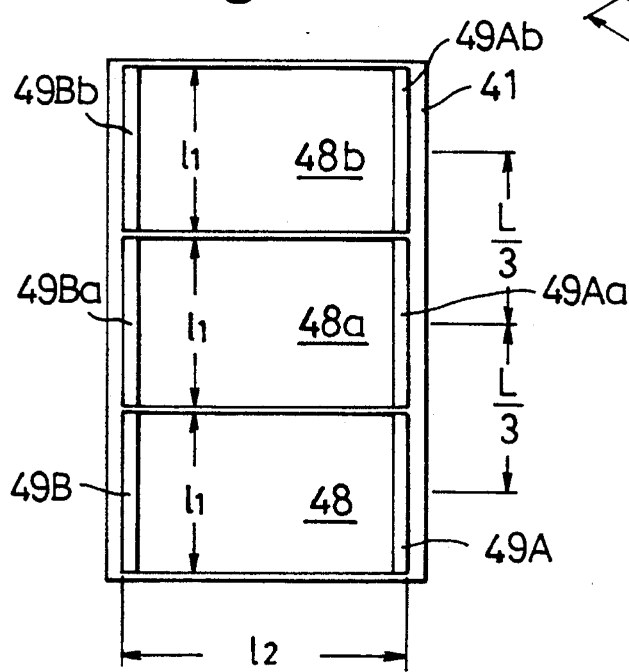
Fig. 20

S
N
S
N
54
N
S
S
N
N
S
N
S
L

101

104
102
112
103
121
122
122a
123

MOVING-COIL LINEAR MOTOR

BACKGROUND OF THE INVENTION

This invention relates to moving-coil linear motors which are applicable to various carrying, conveying and transporting means.

The moving-coil linear motors of the kind referred to may be effectively contributive, for example, to remote-controlled or automated opening and closing of curtains as formed to be small and bilaterally shiftable within a guide frame with curtain rings, so as to be a carrying means for the curtains through the curtain rings.

DESCRIPTION OF RELATED ART

The linear motors have been increasingly widely utilized as the carrying, conveying or transporting means in recent years, and are generally classified into moving-magnet type and moving-coil type. In U.S. Pat. No. 4,633,108 of J. von der Heide et al, there has been shown a linear motor of the moving-magnet type in which a permanent magnet plate is disposed shiftable in magnetic gaps formed in magnetic circuits of a plurality of electromagnetic devices linearly disposed. In this moving-magnet linear motor, however, there has been a problem that the electromagnetic devices acting as a stator means are required to be always supplied with an electric power so that electromagnetic coils of the respective devices are always kept in heat generating state to increase heat generation.

In another U.S. Pat. No. 4,151,447 of J. von der Heide et al, on the other hand, a moving-coil linear motor has been disclosed, in which permanent magnets as the stator means are disposed in two rows and flat armature coils of two-phase motor are disposed to be movable within a magnetic gap between the rows of the permanent magnets. In this arrangement, the electric power is supplied to the movable flat coils only when they are driven as a mover means so that the heat generation of the coils may be reduced to a large extent. With this arrangement, however, the flat coils made movable in the magnetic gap between the two rows of the permanent magnets are requiring the magnetic gap to be of a size larger than the thickness of the flat coils so as to be defective in that the magnetic efficiency is lowered and the entire size of the motor has to be enlarged. Further, this motor shows the use of the flat armature coils but is not suggestive to the provision of cores, so that there remains a problem that the magnetic efficiency cannot be sufficiently improved in this respect.

In still another U.S. Pat. No. 4,439,698 of Der-Jong Chen, a moving-coil linear motor is shown to comprise a rail assembly having a power supply pattern and a solenoid assembly of three-phase coils formed to be movable along the rail assembly. This linear motor is a so-called reluctance type in which no permanent magnet is employed but a ferro-magnetic piece is included in the rail assembly to be attracted by the solenoid assembly for its movement. Since the motor of this reluctance type is relatively low in the torque, there involves a problem that the entire motor size has to be made larger in order that a larger torque is to be attained, in addition to an inherent drawback that the magnetic efficiency cannot be sufficiency increased due to the absence of any core. Further, the moving solenoid assembly is so formed as to surround the rail assembly, so that there is still another problem that any support member cannot be provided to the rail assembly at its intermediate position except for both end portions and an elongated rail assembly becomes insufficient in respect of support strength.

In the case of a further moving-coil linear motor disclosed in U.S. Pat. No. 4,641,065 of Osamu Shibuki et al, a two-phase moving coil assembly U-shaped in section is mounted on a stator means of an array of plate-shaped permanent magnets magnetized to be opposite polarities in their thickness direction, so that the U-shaped coil assembly will enclosingly oppose substantially three consequtive side faces of the permanent magnets, and an exciting current is supplied to this moving coil assembly through brushes from a power feeding pattern provided along the permanent magnet array. An arrangement in which this linear motor of Shibuki et al is applied to curtain opening and closing has been disclosed in Japanese Utility Model Application Laid-Open Publication No. 1-103385 of Shigeru Sakagami et al, assignors to the same assignee as in the present case. In these linear motor and applied arrangement, however, no technique of employing any core in the moving coil assembly while keeping the entire compactness has been reached as yet, and the problem that the magnetic efficiency cannot be remarkably improved has been still left unsolved.

According to an embodiment in the foregoing U.S. Pat. No. 4,633,108 of J. von der Heide et al, in addition, there is disclosed a moving-coil linear motor, in which a mover means is formed by winding coils in three phase system on respective three pole shoes made in a series with respect to a core, and this mover means is disposed to oppose through a magnetic gap a stator means including a row of permanent magnets and to be movable along this stator means. While this motor shows to include the core in the moving coils of the mover means, the core is shown to be merely opposed at its one surface to one surface of the permanent magnets with the magnetic gap interposed, and the magnetic circuit is caused partly to have a relatively long path lying across the other surface of the core and the other surface of the permanent magnets, so that there still has remained the problem that the magnetic efficiency is not sufficiently improved. Further, in this linear motor, the core is made common throughout the three-phase coils so that there has been a problem in that the core has to be large enough for not allowing the linear motor to have a curved path of a relatively small radius.

SUMMARY OF THE INVENTION

A primary object of the present invention is, therefore, to provide a moving-coil linear motor which is provided with cores in the moving coils to remarkably increase the magnetic flux density in the gap for extremely effective improvement in the magnetic efficiency, while still realizing dimensional minimization of the entire motor to a sufficiently satisfiable extent.

This object of the present invention can be realized by a moving-coil linear motor in which a stator means including a permanent magnet array magnetized to have opposite poles in thickness direction and also in longitudinal direction of the array alternately at regular intervals is disposed to form a guide, and a mover means including moving three-phase coils is mounted on the stator means to be movable along the stator means through an electromagnetic force due to positive and negative voltages alternately applied through brushes to the moving coils from a power feed pattern provided on the stator means, characterized in that the moving coils are respectively wound in bipolar system on a core U-shaped in section, both leg portions of which U-shaped cores being opposed to the permanent magnet array disposed between the leg portions.

Other objects and advantages of the present invention will be made clear as the invention is described in detail with reference to embodiments shown in accompanying drawings.

BRIEF DESCRIPTION OF THE DRAWINGS

FIG. 17 shows in a schematic perspective view a part of the mover means in another working aspect of the linear motor according to the present invention;

FIG. 18 is a perspective view as magnified of a core in the mover means of FIG. 17;

FIG. 19 shows in a plan view a base of the mover means in the another aspect of FIG. 17;

FIG. 20 is a front elevation of the base of FIG. 19;

While the present invention shall now be described with reference to the embodiments shown in the accompanying drawings, it should be appreciated that the intention is not to limit the present invention only to the embodiments shown but to rather include all modifications, alterations and equivalent arrangements possible within the scope of appended claims.

DETAILED DESCRIPTION OF THE PREFERRED EMBODIMENTS

Figure 1:
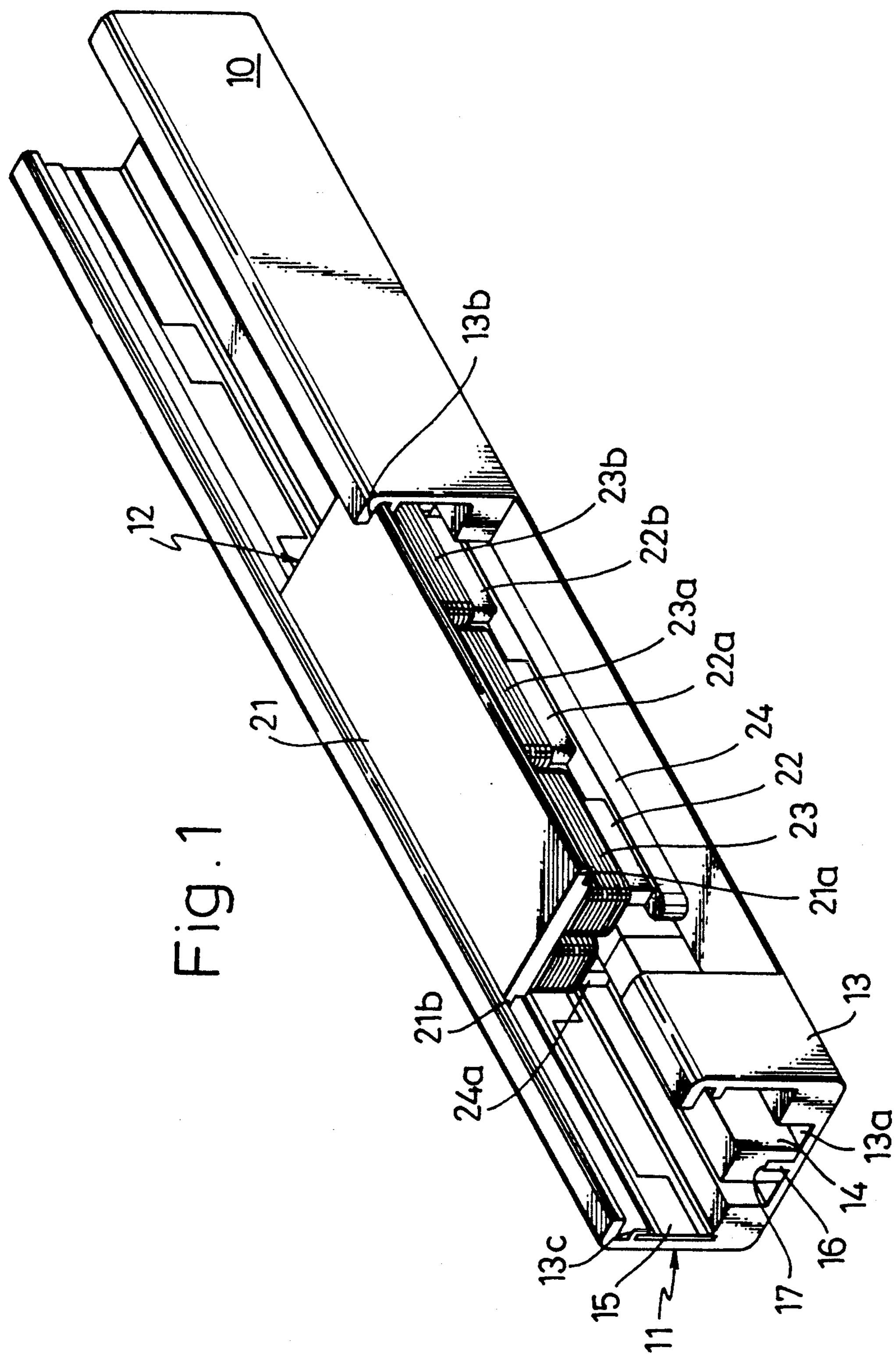
FIG. 1 is a fragmentary perspective view of a moving coil linear motor according to the present invention, with a part shown as being cut off.
Figure 2:
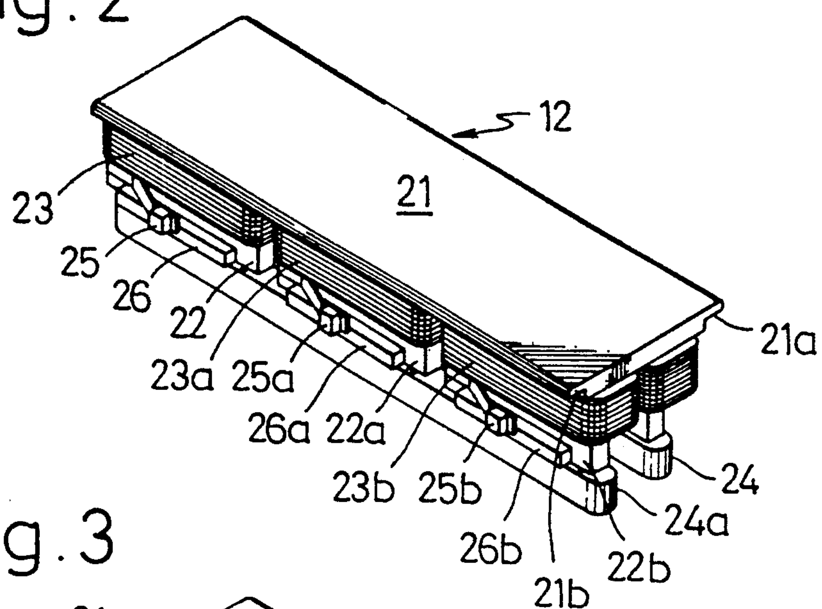
FIG. 2 is a perspective view of a mover means in the linear motor of FIG. 1 as viewed at different angle from that of FIG. 1.

Referring to FIGS. 1 and 2, there is shown here an embodiment of the moving-coil linear motor according to the present invention, in which the linear motor 10 generally comprises a stator means 11 and a mover means 12. The stator means 11 comprises an elongated guide frame 13 substantially U-shaped in section, a permanent magnet array 14 extending substantially over the entire length of the frame 13 as disposed in recessed part 13*a* formed longitudinally in inner bottom wall of the guide frame 13, and a power feed pattern 15 secured to one longitudinal side wall of the guide frame 13, and this stator means 11 functions as a guide for the mover means 12.

Figure 3:
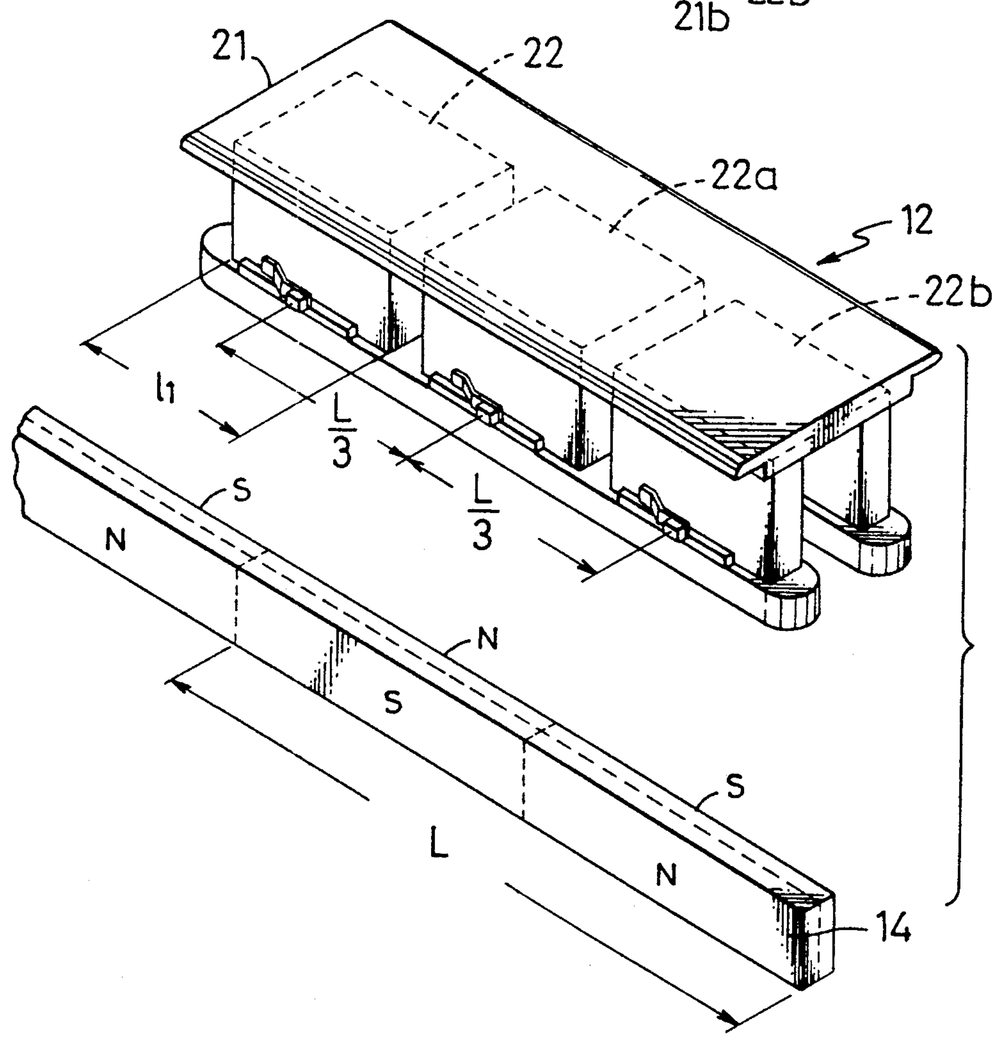
FIG. 3 is a perspective view as disassembled of the stator and mover means for explaining the structure of the linear motor of FIG. 1.

The permanent magnet array 14 is provided in an elongated flat plate shape as shown in FIG. 3, and is so magnetized as to have alternately opposite poles, i.e., N and S poles, at regular intervals in longitudinal direction and also to be in the opposite polarities in thickness direction to be N and S poles. In mounting the permanent magnet array 14 to the guide frame 13, it is preferable to realize it by urging longitudinally extending projection 16 in the recessed part 13*a* into a groove 17 longitudinally made in the permanent magnet array 14. Here, each N pole and each S pole mutually adjacent in longitudinal direction of the permanent magnet array 14 are made to be a pair set to be of a length L, as shown in FIG. 3. On the other hand, the power feed pattern 15 comprises as shown particularly in FIG. 4 upper and lower conductor parts 19 and 20 arranged above and below along the side wall of the guide frame 13 through an insulating zone 18 extending in the longitudinal direction of the frame 13 in zigzag pattern turning at right angles at a constant pitch. In this case, the insulating zone 18 is made to have a width L/6 at its respective portions 18*a* lying in width direction of the power feed pattern, and respective portions projecting in the width direction of the upper and lower conductor parts 19 and 20 are made to have a length L/3 in the longitudinal direction of the pattern 15.

The mover means 12 is formed in an electromagnetic device assembly of three-phase structure with respect to a flat plate-shaped base 21. Three cores 22, 22*a* and 22*b* respectively formed by a laminate of flat U-shaped iron plates are mounted to the base 21, preferably as seated in recesses made in the base, and coils 23, 23*a* and 23*b* are wound in bipolar system respectively on each of the cores 22, 22*a* and 22*b*, so as to form the moving coils of the mover means. Respective parallel leg portions of the U-shaped cores 22, 22*a* and 22*b* are disposed on both sides of the permanent magnet array 14 as disposed within the recessed part 13*a* of the guide frame 13 at extended ends of the both legs so as to oppose the permanent magnet array 14 disposed between the core legs, while shoe members 24 and 24*a* preferably of an insulating material are mounted each across the three leg portions on each side of the array 14 throughout the three cores 22, 22*a* and 22*b*. These shoe members 24 and 24*a* are to be thus disposed each between one side face of the permanent magnet array 14 and opposing side wall of the recessed part 13*a* of the guide frame 13, so that a clearance between the one side face of the permanent magnet array 14 and the opposing side wall of the recessed part 13*a* can be prevented from becoming excessively large or small, and the leg portions of the cores 22, 22*a* and 22*b* are assured to be freely movable reciprocatingly in stable manner without substantial play with respect to the guide frame 13.

Further, brushes 25, 25*a* and 25*b* are provided respectively to each of the cores 22, 22*a* and 22*b* on their one common side as connected to the coils 23, 23*a* and 23*b* and are formed to be contactable with the power feed pattern 15 on the one inner side wall of the guide frame 13. Preferably, these brushes 25, 25*a* and 25*b* may be mounted to brush supporters 26, 26*a* and 26*b* secured to one 24*a* of the shoe members 24 and 24*a*. The flat plate-shaped base 21 is formed to have longitudinal side edges 21*a* and 21*b* made thinner than other portions, and the base 21 is mounted to the guide frame 13 with the thinned side edges 21*a* and 21*b* engaged in guide grooves 13*b* and 13*c* made adjacent longitudinal opening edges of both side walls to oppose each other, so that the mover means 12 can be stably slidable with respect to the stator means 11.

When, in the foregoing structure of the mover means 12, the length of the respective cores 22, 22*a* and 22*b* in the longitudinal direction of the mover means 12 is made l1, this length l1 is set to be smaller than the foregoing length L/3 to be $l1 < L/3$, and respective electromagnet devices with the cores 22, 22*a* and 22*b* and moving coils 23, 23*a* and 23*b* wound on these cores are also provided to be of a longitudinal length smaller than L/3. The respective brushes 25 and 25*a* for the respective phases are disposed to be at intervals also of L/3 and to pass substantially through the center of the power feed pattern 15 in its width direction or in height direction of the side walls of the guide frame 13 (see broken line in FIG. 4), so that the positive and negative power voltages will be alternately applied through the brushes 25, 25*a* and 25*b* to the respective moving coils 23, 23*a* and 23*b*.

The operation of the foregoing moving-coil linear motor 10 according to the present invention shall be referred to here. Now, the exciting power is fed in any known manner from the power feed pattern 15 through the brushes 25, 25*a* and 25*b* to the respective three-phase moving coils 23, 23*a* and 23*b* which are wound in the bipolar system so as to be reverse directional at their respective coil portions wound on the both leg portions of each core so that a current will be caused to flow, for example, in clockwise direction through one of such two coil portions but in counterclockwise through the other coil portion, in each of the coils 23, 23*a* and 23*b*. Accordingly, when one of the leg portions of each core is excited to be N-pole, the other leg portion is excited to be S-pole. Assuming here that the brushes 25, 25*a* and 25*b* of the mover means 12 sliding along the power feed pattern 15 are in the contact therewith at three positions 01, 02 and 03 as shown in FIG. 4 by small double circles, then the mover means 12 will be at such position as in FIG. 5 where the current is fed to two moving coils 23 and 23*b* so that the leg portions of the their cores 22 and 22*b* will be of such polarities as shown in FIG. 5, whereby there is caused an electromagnetic repulsion occurred between the both leg portions of the core 22 and an opposing pair of the magnetic poles in the permanent magnet array 14 whereas an electromagnetic attraction is caused to occur between another core 22*b* and another opposing pair of the magnetic poles in the array 14, the mover means 12 being thus subjected to a driving force acting in rightward direction in FIG. 5.

Figure 4:
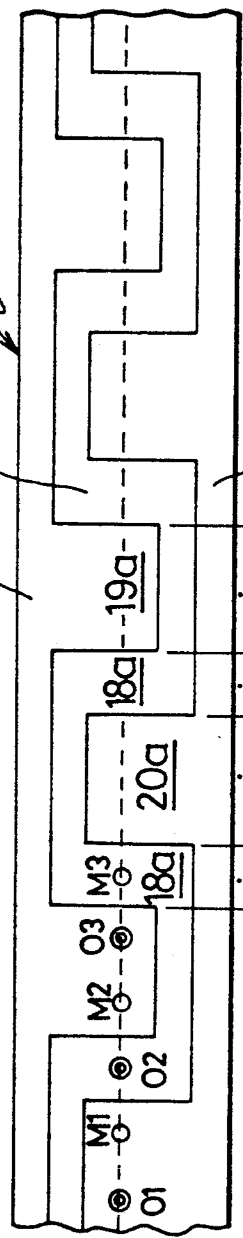
FIG. 4 is a fragmentary plan view of the power feed pattern in the linear motor of FIG. 1.
Figure 5:
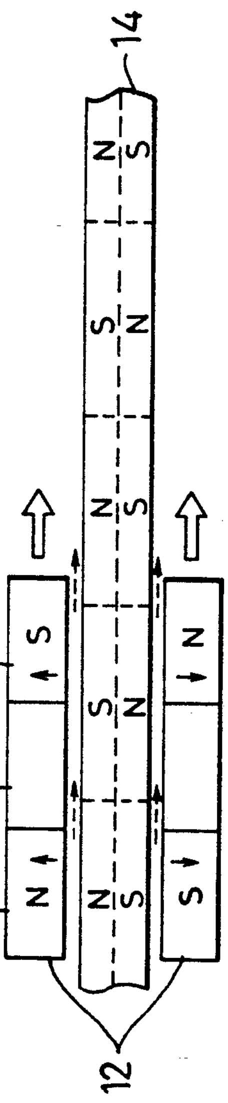
FIGS. 5 through 12 are respectively explanatory views for the operation of the linear motor of FIG. 1.
Figure 6:
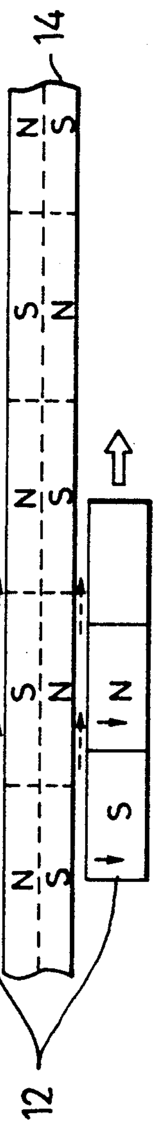
Figure 7:
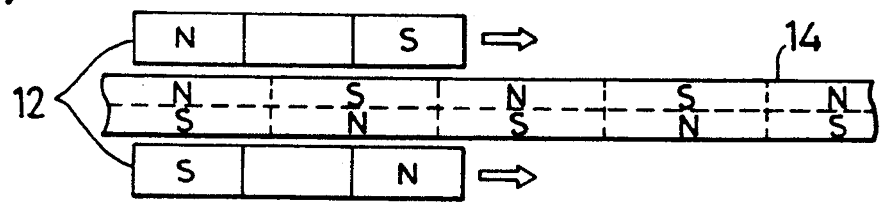
Figure 8:
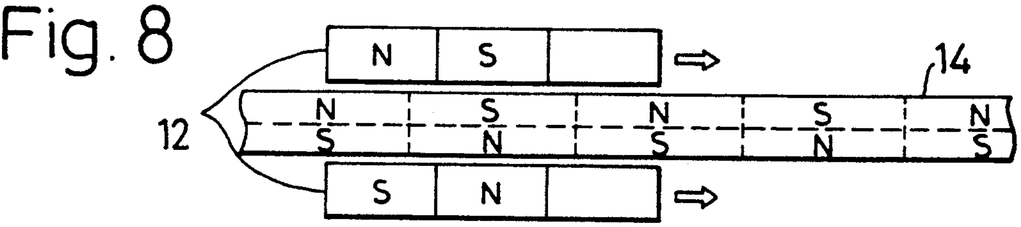
Figure 9:
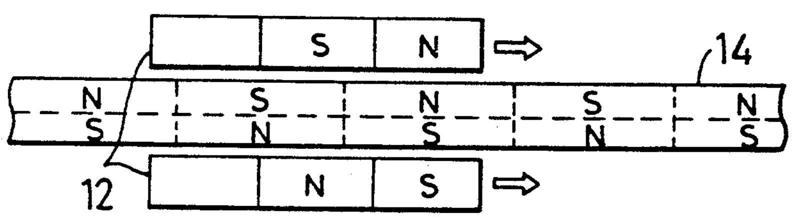
Figure 10:
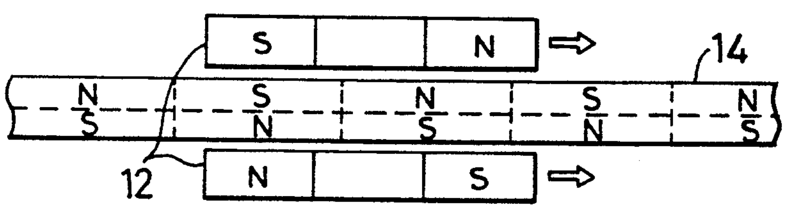
Figure 11:
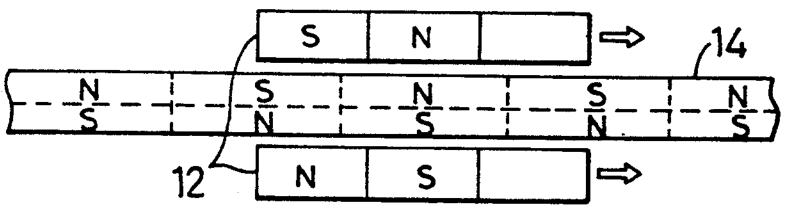
Figure 12:
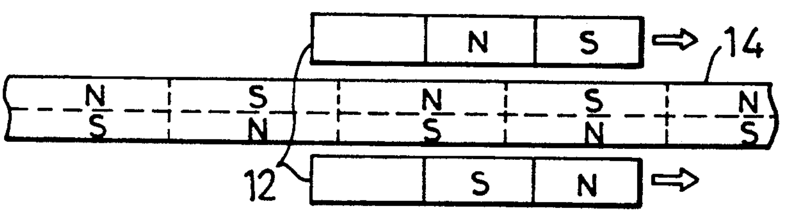

As the mover means 12 is caused to shift by the above driving force to reach a position shown in FIG. 6, the brushes 25, 25*a* and 25*b* are in contact with the power feed pattern 15 at other three points M1, M2 and M3 as shown in FIG. 4 by small single circles, where the current is now fed to two moving coils 23 and 23*a* so that the leg portions of their cores 22 and 22*a* will be of such polarities as shown in FIG. 6, whereby an electromagnetic attraction is caused to occur between the both leg portions of the core 22 and the foregoing another pair of the magnetic poles in the permanent magnet array 14 whereas an electromagnetic repulsion takes place between the leg portions of the adjacent core 22*a* and opposing pair of the poles in the array 14, the mover means 12 being thus subjected to a driving force acting in rightward direction in FIG. 6.

In response to such sliding movement of the brushes 25, 25*a* and 25*b* along the power feed pattern 15, the magnetic polarity of the respective cores 22, 22*a* and 22*b* is changed over sequentially as shown in FIGS. 7 through 12 so that the cores 22, 22*a* and 22*b* will be sequentially driven to move along the permanent magnet array 14, and eventually the mover means is slidingly moved along the guide frame 13 of the stator means 11. During such movement of the mover means 12, as has been briefly referred to, the mover means 12 is allowed to stably move along the stator means 11 without substantial lateral play, since the shoe members 24 and 24*a* mounted commonly to the cores 22, 22*a* and 22*b* are disposed between the both side faces of the permanent magnet array 14 and the both side wall faces of the recessed part 13*a* in the guide frame 13 while the side edges 21*a* and 21*b* of the base 21 are engaged in the guide grooves 13*b* and 13*c* of the frame 13. That is, it is effectively made possible to overcome any of such problem that the cores 22, 22*a* and 22*b* are caused to tilt or deviate with respect to the permanent magnet array 14 so as to collide therewith to impair the driving force given to the mover means 12 while physically damaging the array 14. More particularly, the mover means 12 of the linear motor 10 according to the present invention incorporates effectively the cores 22, 22*a* and 22*b*, so that the motor 10 can be remarkably improved in the magnetic efficiency and the driving force with respect to the mover means 12 can be also remarkably increased. Assuming here that the driving force to the mover means 12 may be limited to be of the same level as that in conventional coreless type linear motors, the motor may be sufficiently made smaller in size, as will be readily appreciated.

Figure 13:
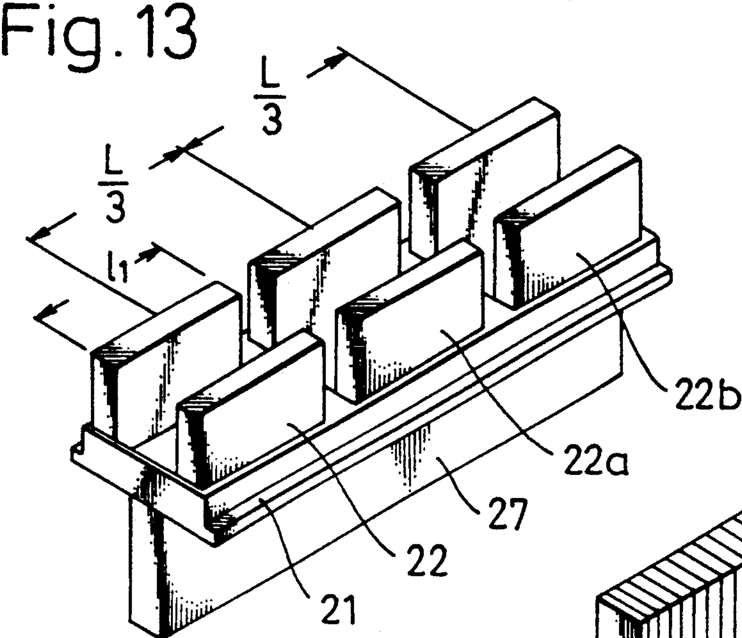
FIG. 13 is a schematic perspective view as magnified of a part of the mover means in the linear motor of FIG. 1 for explaining its structure.
Figure 14:
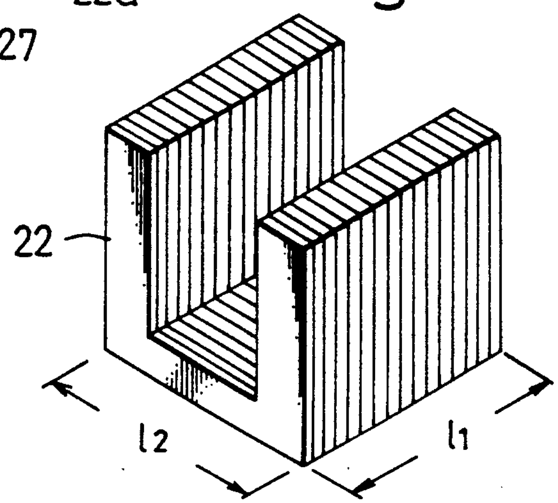
FIG. 14 is a schematic perspective view as magnified of a core in the linear motor of FIG. 1 for explaining its structure.

In the moving-coil linear motor 10 of the foregoing arrangement, further, it is possible to provide thereto a coupling member 27 as secured to the base 21 as shown schematically in FIG. 13, for coupling the motor to some other constituting member of the carrying or transporting means. When the cores formed with the laminate of iron plates and made to be of the longitudinal length l1 is made to have a width directional length l2 as shown in FIG. 14, on the other hand, the base 21 may be required only to be set in the longitudinal length to be slightly larger than 3l1 and in the widthwise length to be slightly larger than l2, and the size reduction is to be realized taking into account these respects.

Figure 15:
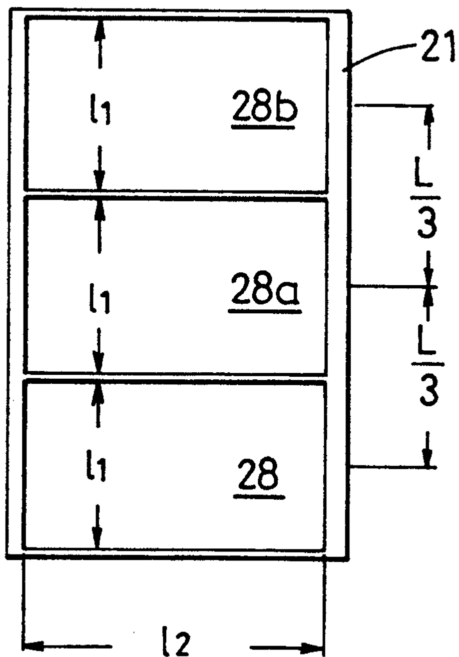
FIG. 15 shows in a plan view a base of the mover means in the linear motor of FIG. 1.
Figure 16:
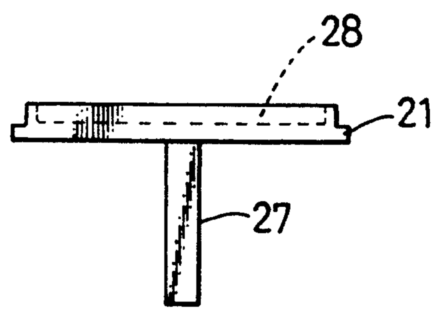
FIG. 16 is a front elevation of the base of FIG. 15.

It is preferable, on the other hand, that the base 21 is formed to have recesses 28, 28*a* and 28*b* respectively of the longitudinal length l1 and the widthwise length l2, as shown in FIGS. 15 and 16, so that the respective cores 22, 22*a* and 22*b* will be seated in these recesses 28, 28*a* and 28*b*. It is desirable in this case to set the recesses 28, 28*a* and 28*b* are at intervals of L/3.

Further, as in another working aspect shown in FIGS. 17 through 20, it is also preferable to form the base and cores in such that engaging projections 49A, 49B; 49A*a*, 49B*a*; and 49A*b*, 49B*b* are provided to side walls of the recesses 48, 48*a* and 48*b* on the side in longitudinal direction of the base 41, engaging grooves 42A, 42B; 42A*a*, 42B*a*; and 42A*b*, 42B*b* are provided in lower and both side faces of the cores 42, 42*a* and 42*b* also on the side in the longitudinal direction of the base 41, and the cores 42, 42*a* and 42*b* are placed in the recesses 48, 48*a* and 48*b* in the base 41 with the projections 49A . . . 49B*b* snap-fitted into the engaging grooves 42A . . . 42B*b*.

Figure 21:
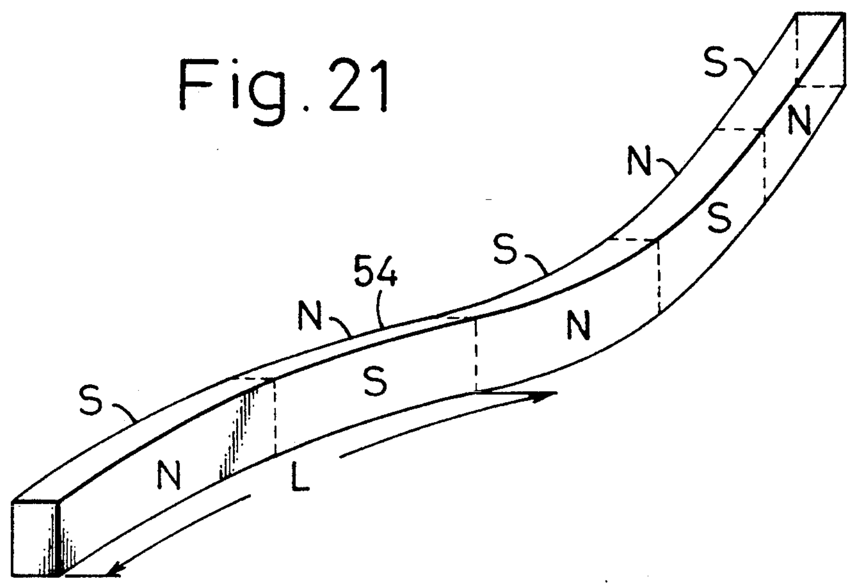
FIG. 21 is a perspective view of the array of permanent magnets in another working aspect in the linear motor according to the present invention.

In the moving-coil linear motor 10 according to the present invention (see FIG. 21), on the other hand, the motor may comprise as the stator means a permanent magnet array 54 made of a material freely curved, which material may be cut in a proper length for freely setting the longitudinal length of the array. For this type of the material, practically, a rubber magnet material may be employed. With this arrangement, the length of the permanent magnet array 54 and eventually of the stator means in its longitudinal direction can be set to be the most preferable in accordance with dimensional and the like conditions at installing position of the linear motor.

In the above arrangement of the linear motor of the present invention, further, the respective cores corresponding to the respective coils are divided so as to form mutually independent magnetic circuits, unlike an arrangement in which the cores are coupled by means of a magnetic member. For this reason, the base which supports these cores may be fabricated with a resilient member or the cores may be mutually coupled through flexible joints and, as will be appreciated by any skilled in the art, the linear motor readily can be made movable along a curved path.

Figure 23:
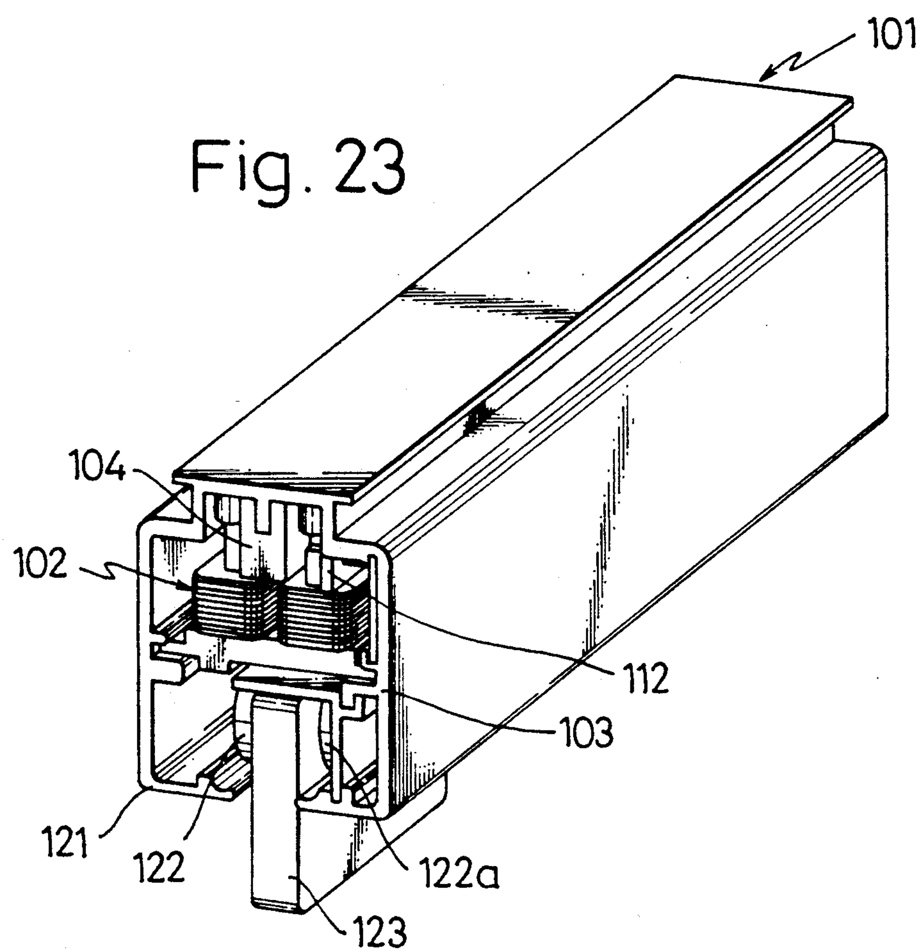
FIG. 23 is a perspective view of the carrier means of FIG. 22.
Figure 22:
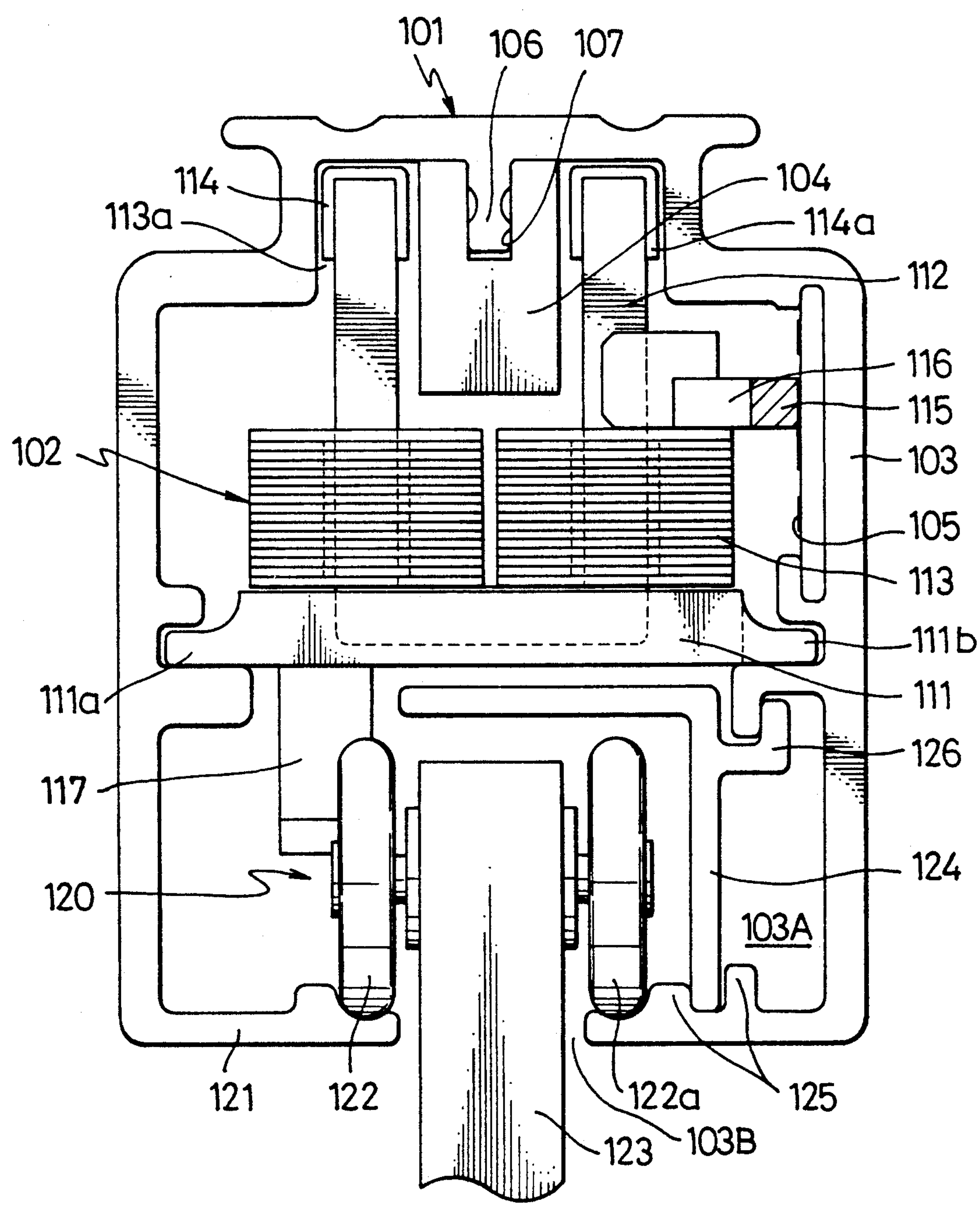
FIG. 22 shows in a sectional view as magnified a working aspect in which the linear motor according to the present invention is applied to a carrier means for opening and closing curtains.

In FIGS. 22 and 23, there is shown an example in which the moving-coil linear motor according to the present invention is applied to a carrier means for opening and closing curtains, with the substantially same constituent members as those in the embodiment of FIGS. 1-3 denoted by the same reference numerals as those used in FIGS. 1-3 but as added by 90. In this case, the guide frame 103 forming the stator means 101 is expanded in height direction (downward in FIGS. 22 and 23 but upward in FIG. 1) to define a further chamber 103A for accommodating therein a shifting means 120 while a bottom wall 121 of this chamber 103A is formed to have a slit 103B extending in longitudinal direction of the frame 103 for passing therethrough curtain rings or hungers. The base 111 is disposed thus in intermediate position in the height direction of the guide frame 103, and is provided with the coupling member 117 extended in L-shape in section and into the chamber 103A to dispose its extended end right above the slit 103B. To this extended end of the coupling member 117, the curtain hunger 123 is joined preferably to be integral with the member 117, while the hunger 123 carries wheels 122 and 122*a* at its upper part disposed inside the chamber 103A for rolling along opposing edges of the slit 103B and extends its lower part through the slit 103B downward to the exterior. Within the chamber 103A, further, a cover member 124 which is substantially L-shaped in section is disposed as engaged in locking portions 125 and 126 properly projected in the chamber 103, so as to extend between the base 111 and the wheels 122*a* and the base 111 and the hunger 123, for preventing any foreign matter entering into upper part of the guide frame 103. Other constituents and their functions are 5, substantially the same as those in the embodiment of FIGS. 1-3.

In the above described carrier means for the curtains with the linear motor of the present invention employed, a power fed through the power feeding pattern 105 and brushes 115 to the coils 113 (shown here only ones for one phase in FIGS. 22 and 23) with desired polarities in a state where curtain rings (not shown) are hung to the hunger 123, then the carrier means is caused to slide in desired direction along the longitudinal direction of the guide frame 103 so that the opening or closing of the curtains can be thereby realized. It should be appreciated that no weight of the curtains and so on is imparted to any other members disposed above the base 111 during the sliding movement of the carrier means so that the carrier means can be smoothly driven to slide in a relatively low load state.

What is claimed is:

1. A moving-coil linear motor comprising a stator means disposed to form a guide, a permanent magnet array included in said stator means and magnetized to have opposite poles in thickness direction of said array and also in longitudinal direction of the array alternately at regular intervals, a mover means mounted to said stator means for movement therealong through an electromagnetic force, cores included in said mover means and U-shaped in section for opposing at both leg parts of said U-shape said permanent magnet array of said stator means disposed between said both leg parts, and moving coils arranged in three phases and wound on said cores in bipolar system, positive and negative voltages being alternately applied from a power feed pattern provided in said stator means through brushes to said moving coils.

2. A motor of claim 1 wherein said stator means comprises an elongated guide frame, said guide frame having on an inner wall thereof a projection extending in longitudinal direction of said guide frame, and said permanent magnet array is provided with a recess extending in longitudinal direction of the array for receiving said projection of the guide frame as urged therein.

3. A motor of claim 2 wherein said projection provided to extend in longitudinal direction of said guide frame is disposed substantially in the center of a recessed part formed in the guide frame to extend in the longitudinal direction, said permanent magnet array being mounted to said projection as spaced from both side walls in said recessed part.

4. A motor of claim 3 wherein said both leg parts of said cores have end portions disposed with a clearance between said permanent magnet array and said both side walls of said recessed part, and shoe members respectively mounted to each of said end portions of the cores.

5. A motor of claim 1 wherein said mover means further includes a flat plate-shaped base for mounting thereto said cores carrying said moving coils wound thereon, and said guide frame is substantially U-shaped in section and having in opposing inner wall surfaces a pair of guide grooves for guiding both side edges of said base.

6. A motor of claim 5 wherein said both side edges of said base are thinned.

7. A motor of claim 1 wherein said stator means comprises an elongated guide frame in which a chamber including an upper part and a lower part is defined, said upper part accommodating therein said mover means, said lower part accommodating therein a shifting means interlocked with said mover means and having in bottom wall a slit extending in longitudinal direction of said guide frame, and said mover means includes a plat plate-shaped base for mounting thereto said cores carrying said moving coils wound thereon, said base being provided with a connecting member for connecting the base to said shifting means which carrying wheels rollable along both side edges of said slit, and said shifting means being extended partly out of said slit for coupling the shifting means to an object to be shifted.

* * * * *